(12) United States Patent
Penick

(10) Patent No.: US 12,156,491 B2
(45) Date of Patent: Dec. 3, 2024

(54) SEEDLING PLANTER

(71) Applicant: Plow Horse Pulling, Inc., Lufkin, TX (US)

(72) Inventor: Justin Penick, Lufkin, TX (US)

(73) Assignee: Plow Horse Pulling, Inc., Lufkin, TX (US)

(*) Notice: Subject to any disclaimer, the term of this patent is extended or adjusted under 35 U.S.C. 154(b) by 865 days.

(21) Appl. No.: 17/229,967

(22) Filed: Apr. 14, 2021

(65) Prior Publication Data

US 2022/0330475 A1 Oct. 20, 2022

(51) Int. Cl.
| | |
|---|---|
| A01C 7/16 | (2006.01) |
| A01C 1/04 | (2006.01) |
| A01C 7/20 | (2006.01) |
| A01C 19/02 | (2006.01) |

(52) U.S. Cl.
CPC ............... *A01C 7/16* (2013.01); *A01C 1/042* (2013.01); *A01C 7/20* (2013.01); *A01C 19/02* (2013.01); *A01C 2001/048* (2013.01)

(58) Field of Classification Search
CPC .. A01C 7/16; A01C 1/042; A01C 7/20; A01C 19/02; A01C 2001/048; A01C 7/08; A01C 7/00; A01C 1/04; A01C 1/00; A01C 19/00
See application file for complete search history.

(56) References Cited

U.S. PATENT DOCUMENTS

| | | |
|---|---|---|
| 4,132,337 A | 1/1979 | Masuda et al. |
| 4,910,911 A | 3/1990 | Ahm |
| 2018/0359912 A1 | 12/2018 | Conrad et al. |

FOREIGN PATENT DOCUMENTS

| | | |
|---|---|---|
| CN | 107343404 A | 11/2017 |
| JP | 11127621 A | 5/1999 |

OTHER PUBLICATIONS

Korean Patent Office, International Search Report issued in PCT/US2022/024510, Jul. 25, 2022, 7 pages.
Korean Patent Office, Written Opinion issued in PCT/US2022/024510, Jul. 25, 2022, 7 pages.

*Primary Examiner* — Christopher J. Novosad
(74) *Attorney, Agent, or Firm* — Barnes & Thornburg LLP; Jerry C. Harris, Jr.

(57) ABSTRACT

A seedling planter is configured to plant a plurality of seedlings in ground. The seedling planter includes a vehicle body, a seedling-storage unit, and a seedling-distribution unit. The seedlings are held together in the form of a seedling package that is stored within the seedling-storage unit. The seedling-distribution unit is configured to separate each seedling from the seedling package and plant each seedling in the ground as the vehicle body travels across the ground. A method includes forming the seedling package.

19 Claims, 8 Drawing Sheets

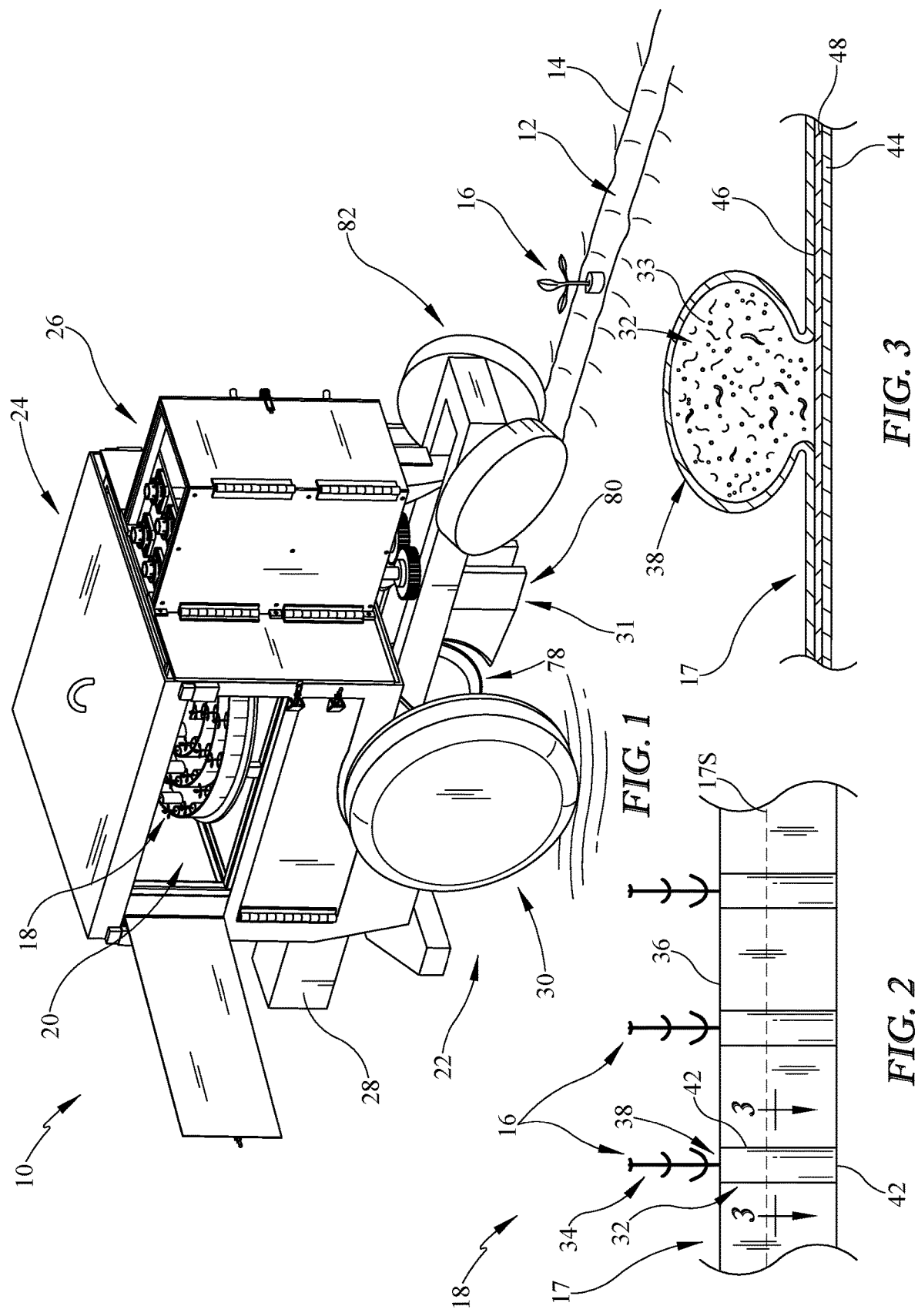

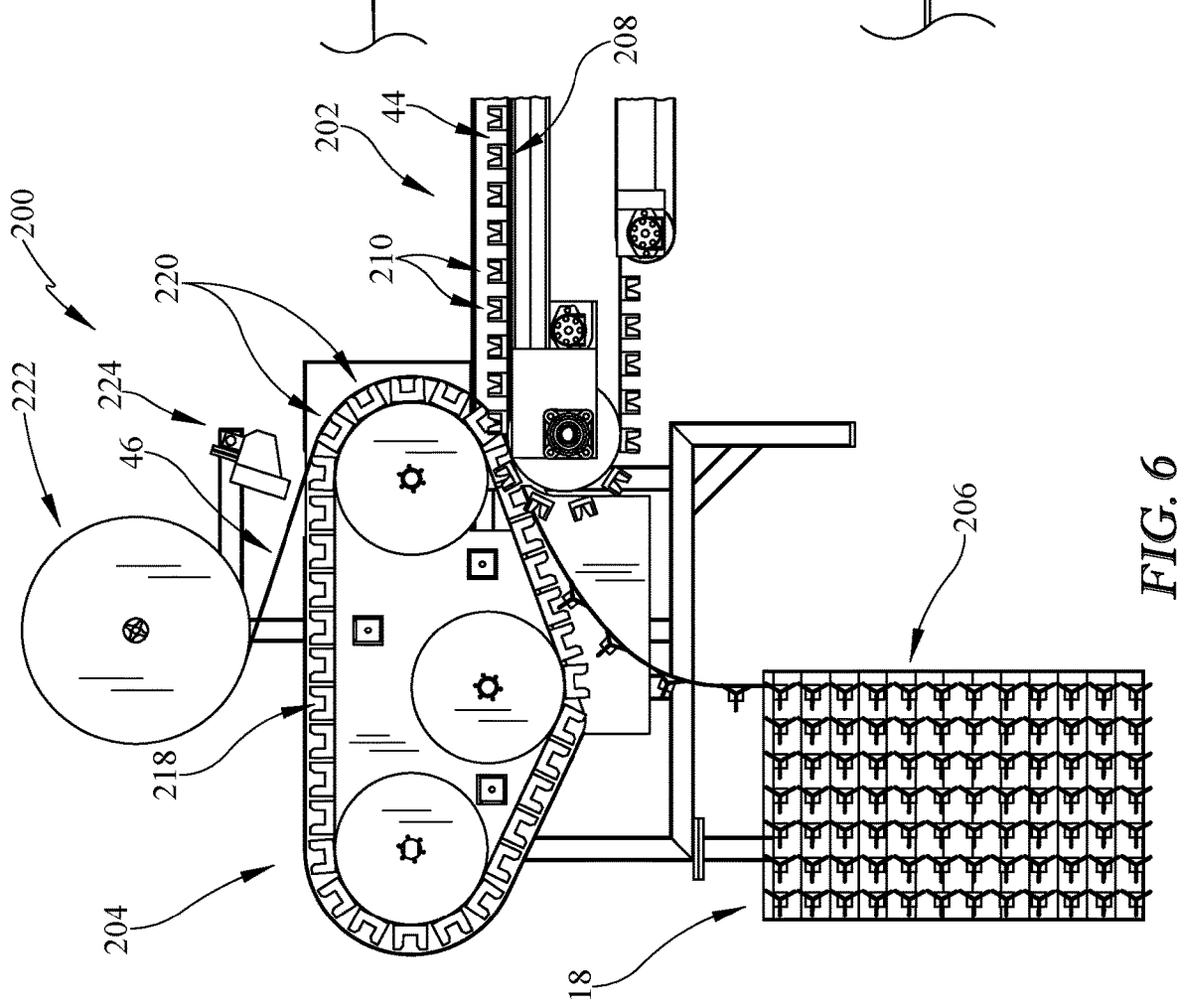
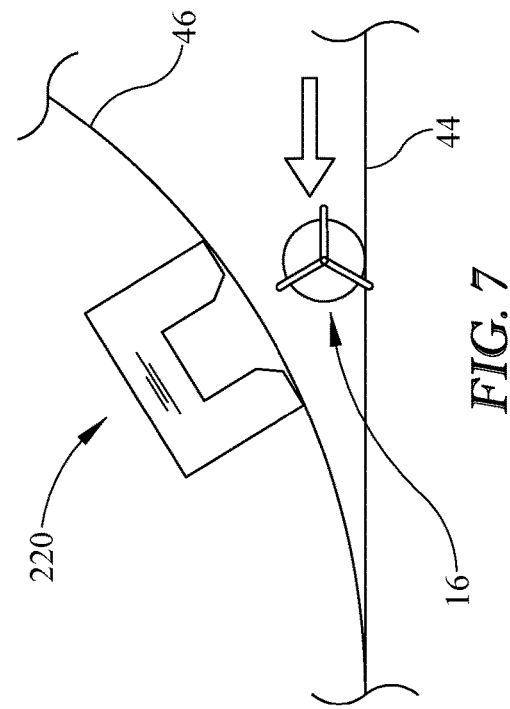
FIG. 7
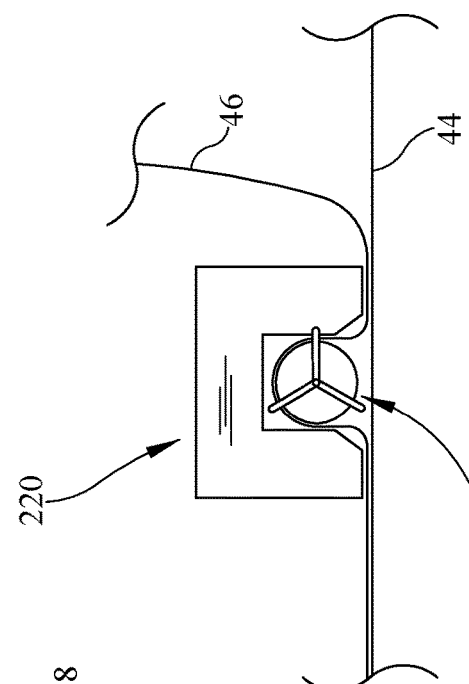
FIG. 8
FIG. 6

SEEDLING PLANTER

BACKGROUND

The present disclosure relates to an apparatus for planting seedlings. More particularly, the present disclosure relates to an apparatus that forms an opening in soil and automatically plants the seedlings in the opening.

SUMMARY

According to one aspect of the present disclosure, a seedling package includes a seedling including a root structure in soil and a shoot structure protruding from the soil. The seedling package may further include a seedling-retainer band including a first sheet arranged to partially surround a first side of the root structure of the seedling and a second sheet arranged to partially surround an opposite second side of the root structure of the seedling. The seedling package may further include an adhesive layer coupled to one of the first sheet and the second sheet. One or both of the sheets may be perforated. In some embodiments, seeds are placed in the seedling-retainer band instead of seedlings.

In some embodiments, the adhesive is applied to a surface of the sheet facing the second sheet such that portions of the first sheet and portions of the second sheet are adhered together to cooperate and at least partially surround the root structure of the seedling. In some embodiments, the sheets and the adhesive layer consists of natural or biodegradable materials. In some embodiments, the adhesive layer is tree sap. In some embodiments, the seedling-retainer band further includes a reinforcement strip that extends longitudinally along a length of one or both of the sheets.

In some embodiments, at least one of the first sheet and the second sheet is infused with at least one of an insecticide, a pesticide, a fungicide, a repellant, and a fertilizer. In some embodiments, the first sheet is infused with a first additive and the second sheet is infused with a second additive different than the first additive. In some embodiments, the first additive includes one of an insecticide, a pesticide, a fungicide, and a fertilizer and the second additive includes another of the insecticide, the pesticide, the fungicide, the repellant and the fertilizer.

In some embodiments, a bottom of the root structure of the seedling is covered by at least one of the first sheet and the second sheet. In some embodiments, the seedling package includes a plurality of seedlings each including a root structure and a shoot structure. In some embodiments, each seedling of the plurality of seedlings is spaced apart from one another along a length of the first sheet and a second sheet.

In some embodiments, the first sheet and the second sheet are adhered to one another by the adhesive layer between each neighboring seedling of the plurality of seedlings. In some embodiments, a bottom of the root structure of each seedling of the plurality of seedlings is covered by at least one of the first sheet and the second sheet.

According to another aspect of the present disclosure, a method of forming a seedling package includes providing a plurality of seedlings. In some embodiments, each seedling includes a root structure in soil and a shoot structure protruding from the soil. In some embodiments, the method further includes placing each seedling on a first sheet in side-by-side relation to one another. In some embodiments, the method further includes conveying the first sheet from an upstream location to a downstream location while carrying each seedling placed on the first sheet. In some embodiments, the method further includes conveying a second sheet toward the first sheet. In some embodiments, the method further includes placing the second sheet on the first sheet and each of the seedlings to locate the plurality of seedlings between the first sheet and the second sheet. In some embodiments, the method further includes forming at least one of the first sheet and the second sheet around each of the seedlings.

In some embodiments, the method further includes a step of applying an adhesive layer on the second sheet separate from the first sheet prior to the step of forming. In some embodiments, each of the seedlings are spaced part from one another and the first sheet and the second sheet adhere to one another between each neighboring seedling.

In some embodiments, the method further includes a step of infusing at least one of the first sheet and the second sheet with at least one of an insecticide, a pesticide, a fungicide, and a fertilizer. In some embodiments, the method further includes a step of adding at least one of an insecticide, a pesticide, a fungicide, and a fertilizer to the root structure of the seedling between the first sheet and the second sheet. In some embodiments, the method further includes a step of packaging the plurality of seedlings in a storage bin.

According to another aspect of the present disclosure, a seedling package includes a plurality of seedlings. In some embodiments, each seedlings includes a root structure in soil and a shoot structure protruding from the soil. In some embodiments, the seedling package further includes a seedling-retainer band at least partially surrounding the root structure of each seedling and the soil.

In some embodiments, the seedling-retainer band is continuous and interconnects each seedling and each of the seedlings are spaced apart from one another along a length of the seedling-retainer band. In some embodiments, the seedling-retainer band includes a first sheet arranged to partially surround a first side of the root structure of the seedling and a second sheet arranged to partially surround an opposite second side of the root structure of the seedling.

In some embodiments, the seedling package further includes an adhesive coupled to one of the first sheet and the second sheet. In some embodiments, the adhesive is applied to a surface of the first sheet facing the second sheet such that portions of the first sheet and portions of the second sheet cooperate to at least partially surround the root structure of each seedling.

In some embodiments, at least one of the first sheet and the second sheet includes at least one of an insecticide, a pesticide, a fungicide, and a fertilizer.

According to another aspect of the present disclosure, a seedling planter includes a vehicle body including a frame, a plurality of wheels supporting the frame above ground, and a soil-opening system configured to form an opening in the ground as the vehicle body travels across the ground. In some embodiments, the seedling planter further includes a seedling-storage unit coupled to the vehicle body and defining an interior space that is configured to store a plurality of seedlings. In some embodiments, the seedling planter further includes a seedling-distribution unit configured to automatically convey the plurality of seedlings from the interior space to the opening in the ground.

In some embodiments, the seedling-storage unit includes a seedling retainer configured to engage at least one of the seedlings, a rotation shaft configured to rotate relative to the vehicle body about a shaft-rotation axis, and a tabletop coupled to the rotation shaft and configured to support the plurality of seedlings in the interior space for rotation with the rotation shaft about the shaft-rotation axis. In some embodiments, the plurality of seedlings are wound around the rotation shaft and the seedling-distribution unit is configured to unwind the plurality of seedlings as the seedling planter travels across the ground.

In some embodiments, the seedling storage unit further includes a loading system including a gear wheel coupled to the rotation shaft for rotation about the shaft-rotation axis with the rotation shaft, a worm gear interlocked with teeth of the gear wheel, and a winding handle coupled to the worm gear. In some embodiments, rotation of the worm gear by the handle drives rotation of at least one of the tabletop and the about the rotation axis to wind the plurality of seedlings around the rotation shaft. In some embodiments, the seedling-storage unit includes a plurality of tabletops, each tabletop coupled to the rotation shaft and configured to support a separate package of the seedlings. In some embodiments, the handle is rotated by a motor.

In some embodiments, the seedling-distribution unit includes a transfer chute configured to carry a single seedling to the ground at a time, a plurality of conveyor rollers configured to transfer the plurality of seedlings from the seedling-storage unit to the transfer chute, and a motion system configured to drive rotation of the conveyor rollers in proportion to a travel speed of the seedling planter across the ground. In some embodiments, the plurality of conveyor rollers includes a first roller and a second roller, and wherein the first roller and the second roller are counter-rotating. In some embodiments, the first roller is formed to include a first plurality of grooves and the second roller is formed to include a second plurality of grooves, and at least one of the first plurality of grooves and the second plurality of grooves is configured to receive a seedling of the plurality of seedlings.

In some embodiments, at least one of the first roller and the second roller includes a plurality of cutting elements that are configured to separate each seedling of the plurality of seedlings into the single seedling upstream of the transfer chute. In some embodiments, the plurality of cutting elements are arranged at an angle relative to a rotation axis of each of the plurality of conveyor rollers.

In some embodiments, the first roller includes a plurality of cutting elements that are configured to separate each seedling of the plurality of seedlings into the single seedling upstream of the transfer chute and the plurality of grooves formed on the second roller are each aligned angularly with a corresponding cutting element of the plurality of cutting elements such that each cutting element extends into the corresponding groove per revolution of the first roller and the second roller.

In some embodiments, the seedling-storage unit includes a rotation shaft configured to rotate relative to the vehicle body about a shaft-rotation axis, wherein the plurality of seedlings are wound around the rotation shaft and the plurality of conveyor rollers are configured to unwind the plurality of seedlings as the seedling planter travels across the ground.

According to another aspect of the present disclosure, a seedling-package forming system includes a first conveyor including a first track and a first sheet arranged on the first track. In some embodiments, the first track is configured to transport the first sheet from an upstream position to a downstream position.

In some embodiments, the system includes a second conveyor located at the downstream position. In some embodiments, the second conveyor includes a second track and a second sheet arranged to lie on the second track. In some embodiments, the second track is configured to transport the second sheet toward the first sheet.

In some embodiments, the system further includes a plurality of seedlings arranged to lie on one of the first sheet and the second sheet. In some embodiments, the plurality of seedlings are arranged between the first sheet and the second sheet downstream of the downstream position.

In some embodiments, the first sheet, the second sheet, and the plurality of seedlings form a continuous sleeve when the plurality of seedlings are arranged between the first sheet and the second sheet. In some embodiments, the first conveyor further includes a plurality of seedling-shoot holders arranged adjacent to the first track and wherein the shoot structure of each seedling is arranged to lie in one seedling-shoot holder to position each of the seedlings in spaced apart relation to one another.

In some embodiments, the first sheet is initially arranged in a roll at one end of the first conveyor. In some embodiments, the first conveyor further includes a first roller and a second roller and the track forms a loop around the first roller and the second roller.

In some embodiments, the second conveyor further includes a plurality of seedling packers coupled to the second track and the second sheet is arranged to lie on the plurality of seedling packers. In some embodiments, each of the seedling packers has a u-shaped cross section and is configured to receive a single seedling that is resting on the first sheet and is configured to pack the second sheet around the root structure of each seedling and press the second sheet into contact with the first sheet on each side of the seedling. In some embodiments, the second conveyor further includes an adhesive applicator that is configured to apply an adhesive on the second sheet prior to the second sheet reaching the first sheet.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a seedling planter that is configured to automatically convey and drop seedling packages into an opening formed in soil by the seedling planter;

FIG. 2 is a side elevation view of a portion of a seedling package that holds a plurality of seedlings together prior to being separated from one another and planted by the seedling planter shown in FIG. 1;

FIG. 3 is a cross-sectional view taken along line 3-3 in FIG. 2 showing that the seedling package includes a first sheet, an opposite second sheet, and an adhesive that binds the first sheet to the second sheet with each of the seedlings arranged therebetween;

FIG. 6 is an enlarged view of a portion of the seedling-package forming system from FIG. 4 showing that the system includes a first conveyor that advances the first sheet and a second conveyor that advances the second sheet toward the first sheet to arrange the plurality of seedlings between the first sheet and the second sheet and form the seedling package shown in FIG. 2;

FIG. 7 is a side view of a portion of the seedling-package forming system showing a seedling resting on the first sheet and suggesting that the seedling is being advanced toward the second sheet;

FIG. 8 is a side view similar to FIG. 7 showing the seedling being packed between the first sheet and the second sheet to form the seedling package;

Figure 12:
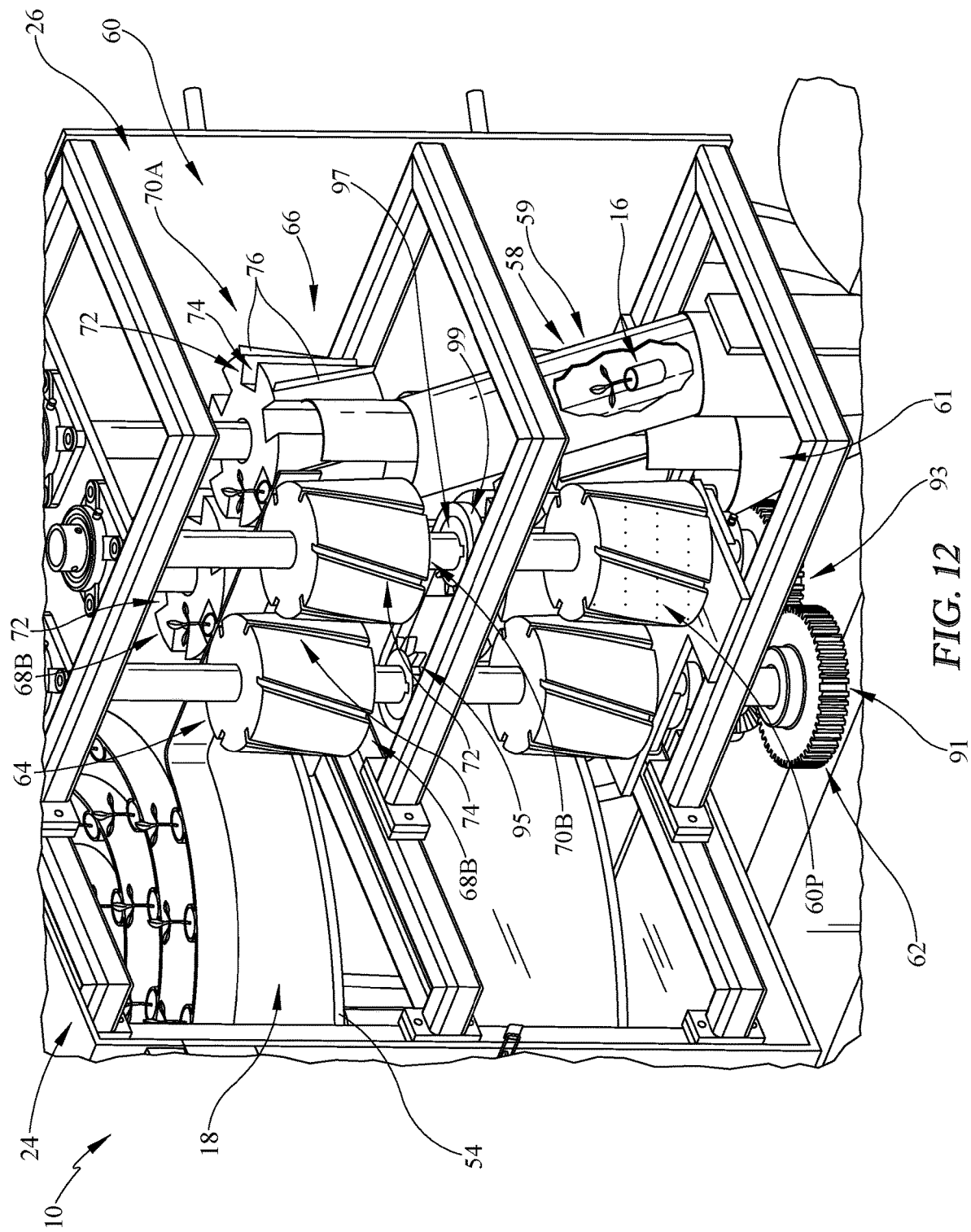
Figure 13:
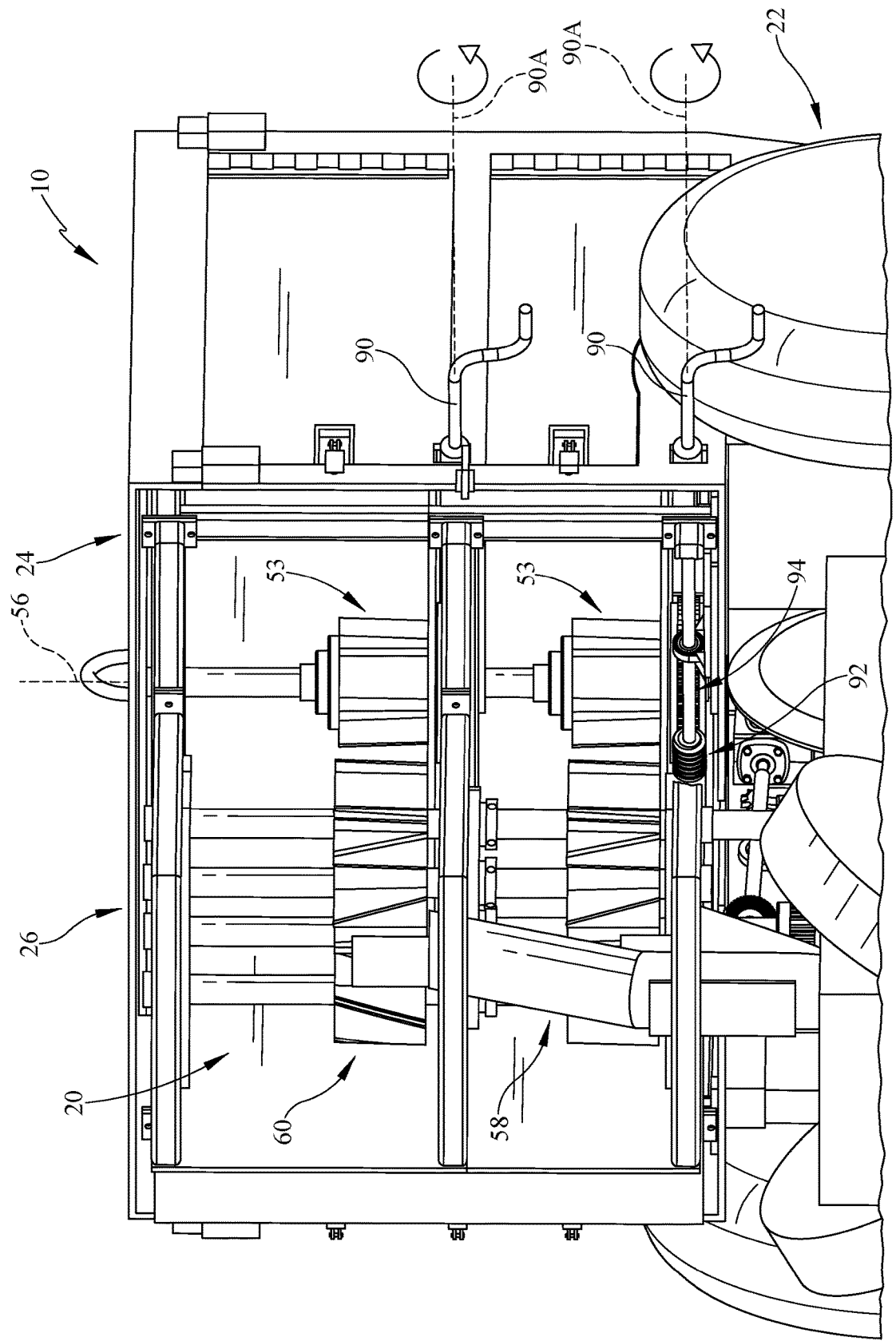

FIG. 12 is a perspective view of the seedling distribution unit pulling the seedling package aft toward a transfer chute and separating each individual seedling from the seedling package so that each individual seedling is transferred to the opening formed in the soil; and FIG. 13 is a perspective view showing that the seedling planter further includes a loading system that may be operated to wind the seedling package around the seedling retainer within the interior space of the seedling planter.

DETAILED DESCRIPTION

A seedling planter 10, in accordance with the present disclosure, is configured to travel over ground and form an opening 12 in soil 14 so that a plurality of individual seedlings 16 may be dropped into the opening 12 as shown in FIG. 1. The seedling planter 10 houses a seedling package 18 within an interior space 20 of the seedling planter 10. The seedling planter 10 is configured to automatically convey and separate each individual seedling 16 from the seedling package 18 and drop each individual seedling 16 into the opening 12 at periodic intervals as the seedling planter 10 travels across the ground. The periodic intervals may be adjusted through gearing, speed of the planter, or rotation of a driving component (i.e. a coulter) so that individual seedlings are dropped from the planter 10 at any desired spacing between one another.

The seedling planter 10 includes a vehicle body 22, a seedling-storage unit 24, and a seedling-distribution unit 26 as shown in FIG. 1. The vehicle body 22 includes a frame 28, a plurality of wheels 30 supporting the frame 28 above the ground, and a soil-opening system 31 configured to provide the opening 12 in the ground 14. The seedling-storage unit 24 is supported above the ground by the vehicle body 22 and is configured to store the seedling package 18. The seedling-distribution unit 26 is configured to automatically convey the seedling package 18 from the seedling-storage unit 24 toward the ground. The seedling-distribution unit 26 separates each seedling 16 from the rest of the seedling package 18 and then drops the individual seedling 16 into the opening 12 formed in the ground 14 by the soil-opening system 31.

The plurality of seedlings 16 are held together as a unit to provide the seedling package 18 prior to being separated by the seedling-distribution unit 26 and then planted in the opening 12 formed in the ground 14 as shown in FIGS. 1 and 2. A portion of the seedling package 18 is shown in FIG. 2. The seedling package 18 is an elongated and continuous strip including the plurality of seedlings 16 and a seedling-retainer band 17. Each seedling 16 includes a root structure 32 in soil 33 and a shoot structure 34 protruding from the soil 33. The seedling-retainer band 17 is configured to at least partially enclose the root structure 32 of each seedling 16 and the soil 33 in which the root structure 32 of each seedling 16 is embedded. The shoot structure 34 extends upwardly above a top end 36 of the seedling-retainer band 17 away from the root structure 32 and the soil 33. In some embodiments, the seedling-retainer band 17 is formed to include a plurality of pockets 38, one pocket 38 being formed for each seedling 16. Illustratively, each seedling 16 is arranged to lie in a pocket 38 so as to be bordered by the seedling-retainer band 17 on a side wall 40 and a bottom 42 of each seedling 16 while a top end of the pocket 38 is open so that the shoot structure 34 extends upwardly therethrough. Each seedling 16 is spaced apart from each neighboring seedling 16 along a length of the seedling-retainer band 17 as shown in FIG. 2.

The seedling-retainer band 17 includes a first sheet 44 arranged to partially surround a first side of the root structure 32 of each seedling 16 and the soil 33 and a second sheet 46 arranged to partially surround an opposite second side of the root structure 32 of each seedling 16 as shown in FIG. 3. Each seedling 16 is arranged to lie between the first sheet 44 and the second sheet 46 for transportation and/or storage prior to planting. The first sheet 44 and the second sheet 46 may remain coupled to each seedling 16 after each seedling 16 is planted. Because of this, the first sheet 44 and the second sheet 46 are each illustratively formed from a paper material or another natural or organic material so that at least a majority of the seedling-retainer band 17 is natural and/or biodegradable after being planted. In other embodiments, another material may be used for the first sheet 44 and the second sheet 46 such as cardboard, vellum, rice paper, woven fibers, or any other suitable biodegradable paper or film. In some embodiments, only a single sheet 44 is used and is formed around each of the seedlings 16.

In some embodiments, the seedling-retainer band 17 further includes a reinforcement strip 17S that extends along a length of one or both of the sheets 44, 46 as shown in FIG. 2. The reinforcement strip 17S is configured to increase an overall tensile strength of the seedling-retainer band 17 so that the seedlings are held together as they are pulled through the seedling planter 10 and to block premature separation of each seedling 16. The reinforcement strip 17S may include a nylon strip or another type of material that is natural and/or organic and has a greater tensile strength than the sheets 44, 46 in at least some situations, such as if the sheets 44, 46 become wet.

In the depicted embodiment shown in FIG. 3, an adhesive layer 48 binds the first sheet 44 to the second sheet 46. The adhesive 48 is applied to a surface of at least one of the sheets 44, 46 facing the other sheet 44, 46. Portions of the first sheet 44 and the second sheet 46 are adhered together by the adhesive layer 48 such that the first and second sheets 44, 46 cooperate and fully surround the root structure 32 of each seedling 16. Illustratively, the adhesive layer 48 consists of an organic and/or biodegradable material. In one embodiment, the adhesive material 48 includes a sap such as pine sap, for example. In other embodiments the adhesive layer 48 is removed and the first and second sheets 44, 46 are held together by other means such as by mechanically binding the first and second sheets 44, 46 together using twine or another biodegradable, rope-like structure. In yet another embodiment, the first and second sheets 44, 46 are mechanically bound together by pressing the first and second sheets 44, 46 (i.e. with pressure and/or heat) to cause interferences therebetween which holds the first and second sheets 44, 46 together.

In some embodiments, the seedling retainer band 17 is coated with a wax or another heat-curable material. The wax may be heated as the seedling package 18 is formed to bind and join the first sheet 44 to the second sheet 46 around each seedling 16 so as to provide the adhesive layer 48. The wax may be waterproof or water-resistant to block the first sheet 44 and the second sheet from dampening by moisture which may cause premature separation of the seedlings 16 from one another.

The seedling package 18 may also include one or more additives to facilitate growth and/or protection of the seedlings 16. For example, one or both of the sheets 44, 46 can be coated or infused with an insecticide, a pesticide, a fungicide, a repellant, and/or a fertilizer. As the seedling 16 grows and the sheets 44, 46 degrade, the additives are released and absorbed by the root structure 32 of the seedling 16. In another example, the additives are included in the adhesive layer 48. In yet another embodiment, the additives are integrated into the soil 33 surrounding the root structure 32 of each seedling 16. In some embodiments, one sheet 44, 46 may include a first additive (i.e. a fertilizer) and the other sheet 44, 46 may include a second additive (i.e. an insecticide). In some embodiments, one sheet 44, 46 may include a first additive (i.e. a fertilizer), the other sheet 44, 46 may include a second additive (i.e. an insecticide), and the adhesive layer 48 may include a third additive (i.e. a fungicide). Separating the additives from one another on the various components of the seedling-retainer band 17 may minimize reactions between the various additives which could harm the seedlings 16 after the package 18 is formed.

The first sheet 44 and the second sheet 46 are applied to one another with each seedling 16 arranged between the first sheet 44 and the second sheet 46 through a seedling-package forming process. The seedling-package forming process includes providing a plurality of seedlings 16 and placing the root structure 32 of each seedling on the first sheet 44. The seedlings 16 are placed on the first sheet 44 in side-by-side relation to one another and are spaced apart from one another along the length of the first sheet 44. The adhesive layer 48, if used, may be applied on either the first sheet 44 or the second sheet 46. The first sheet 44 and the second sheet 46 may then be brought into face-to-face contact with one another with the seedlings 16 located between the first sheet 44 and the second sheet 46. The first and/or second sheet 44, 46 may be packed or formed around the root structure 32 of each seedling so that the sheets 44, 46 hold the root structure 32 and the soil 33 in place. If only a single sheet 44 is used, the sheet 44 is formed around each of the seedlings 16.

Figure 4:
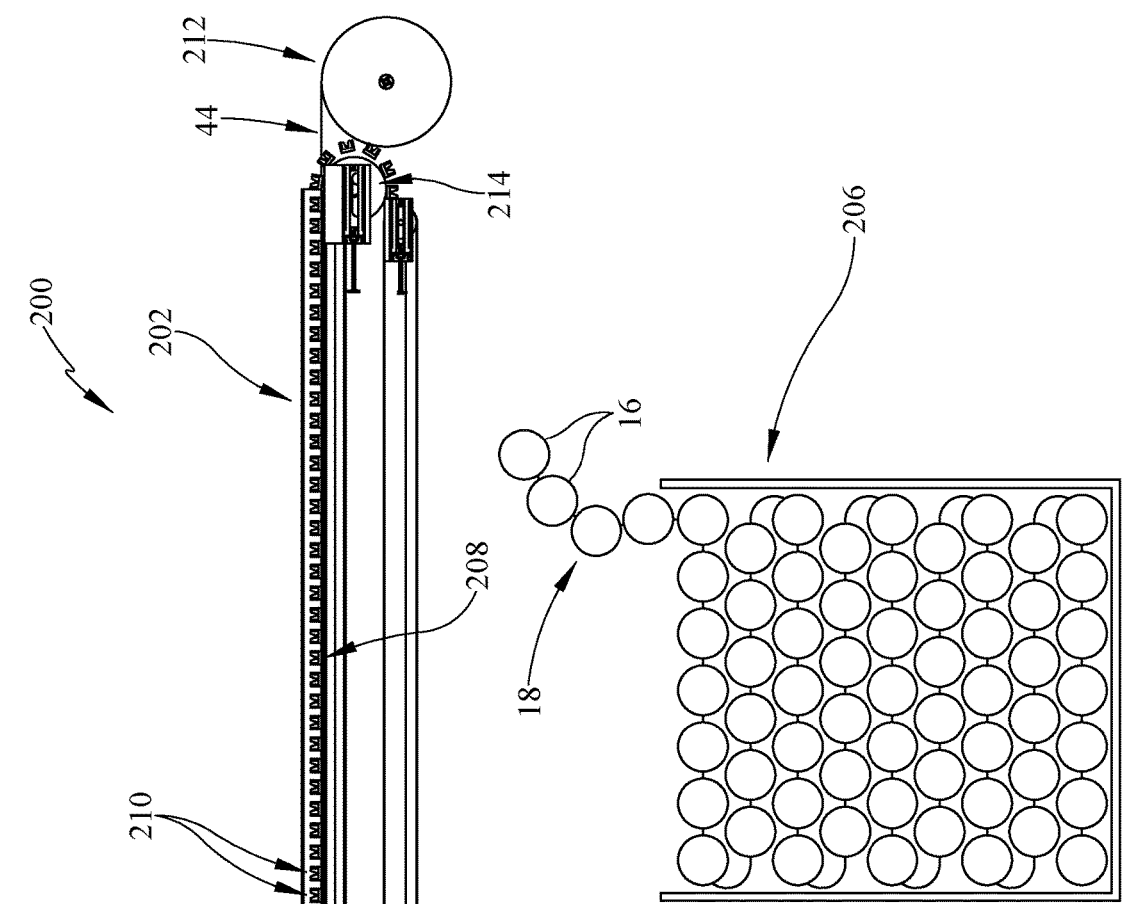
FIG. 4 is a side elevation view of a seedling-package forming system that is configured to form the seedling package shown in FIGS. 2 and 3.

In the illustrative embodiment, the seedling-package forming process is performed by a seedling-package forming system 200 as shown in FIG. 4. The seedling-package forming system 200 includes a first conveyor 202 and a second conveyor 204. The first conveyor 202 is configured to carry and advance the first sheet 44 toward the second conveyor 204. The second conveyor 204 is configured to carry an advance the second sheet 46 toward the first sheet 44. Each of the seedlings 16 are placed on the first sheet 44 upstream of the second conveyor 204 and are carried by the first conveyor 202 toward the second conveyor 204 and the second sheet 46.

Figure 5:
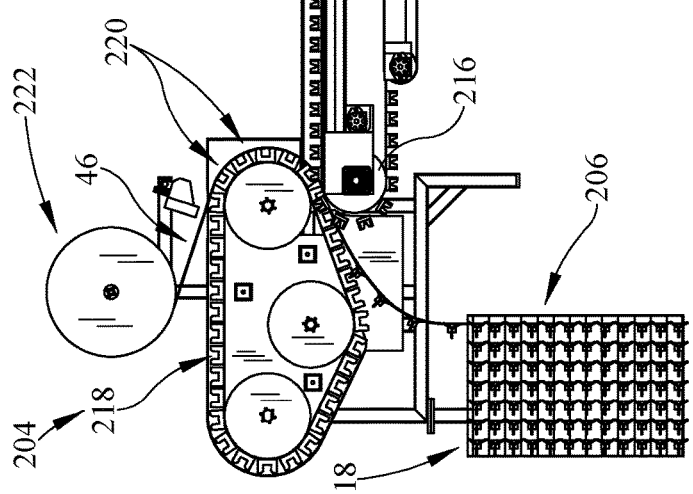
FIG. 5 is a side elevation view showing the seedling package being conveyed into a storage bin and forming a serpentine arrangement to maximize an amount of seedlings that are stored in the storage bin.

The first and second conveyors 202, 204 cooperate to place the first and second sheets 44, 46 around the seedlings 16 to form the seedling package 18. Once formed, the seedling package 18 may be moved to a storage bin 206 and layered for storage in the bin 206 until the seedling package 18 is transferred to the seedling planter 10 as shown in FIG. 5. The seedling package 18 may form a serpentine arrangement in the storage bin 206 as it is layered with each seedling being arranged above and offset from seedlings in neighboring layers within the storage bin 206 to maximize the amount of seedlings 16 placed in the storage bin 206. In some embodiments, the seedling package 18 may be transferred from the seedling-package forming system 200 directly to the seedling planter 10.

The first conveyor 202 includes a first track 208 and a plurality of seedling-shoot holders 210 coupled to or arranged adjacent to the first track 208 as shown in FIGS. 4 and 6. The first sheet 44 may be initially arranged in a roll 212 at one end of the first conveyor 202. The first conveyor 202 is configured to unroll the first sheet 44 from the roll 212 as the conveyor 202 advances the first sheet 44 toward the second conveyor 204. Each seedling 16 is placed on the first conveyor 202 and arranged such that the root structure 32 rests on the first sheet 44 and the shoot structure 34 rests on a corresponding seedling-shoot holder 210. The seedling-shoot holders 210 are spaced apart from one another so that each seedling 16 is positioned with spacing between one another along the length of the first sheet 44 and a length of the seedling-retainer band 17 once the seedling package 18 is fully formed.

The first conveyor 202 further includes a first roller 214 and a second roller 216 as shown in FIG. 4. The track 208 forms a loop around the first roller 214 and the second roller 216. The rollers 214, 216 rotate about respective axes to drive the track 208 and advance the first sheet 44 and each of the seedlings 16 toward the second conveyor 204 following a path of the loop. In some embodiments, the first conveyor 202 may only include one roller.

The second conveyor 204 includes a second track 218 and a plurality of seedling packers 220 coupled to the second track 218 as shown in FIGS. 4 and 6. The second sheet 46 may be initially arranged in a roll 222 and the second conveyor 204 is configured to unroll the second sheet 46 from the roll 222 as the conveyor 204 advances the second sheet 46 toward the first conveyor 202. Once unrolled, the second sheet 46 is arranged to lie on the plurality of seedling packers 220 and is carried by the second track 218 toward the first sheet 44 and the plurality of seedlings 16 resting thereon.

The seedling-package forming process may further include conveying the first sheet 44 from an upstream location (i.e. at roll 212) to a downstream location (i.e. at second conveyor 204. The seedlings 16 may be placed on the first sheet 44 between the upstream location and the downstream location. At the same time, the second sheet 46 is conveyed toward the first sheet 44 and applied on top of each the seedlings to locate each seedling 16 between the first sheet 44 and the second sheet 46.

Each of the seedling packers 220 has a u-shaped cross section and is configured to receive a single seedling 16 that is resting on the first sheet 44 as the first sheet 44 is conveyed downstream by the first conveyor 202 and the second sheet 46 is conveyed downstream by the second conveyor 204 as shown in FIGS. 7 and 8. Each seedling packer 220 is configured to pack the second sheet 46 around the root structure 32 of each seedling 16 while pressing the second sheet 46 into contact with the first sheet 44 on each side of the seedling 16 as shown in FIG. 8. Thus, each seedling 16 is held in place by the first and second sheets 44, 46.

The seedling-package forming process may further include applying the adhesive layer 48 on one of the first sheet 44 and the second sheet 46 prior to the first and second sheets 44, 46 being placed into contact with each other. An adhesive applicator 224 may be coupled to the second conveyor 204 and positioned upstream of the first sheet 44 to apply the adhesive layer 48 on the second sheet 46 prior to the second sheet 46 reaching the first sheet 44. In another embodiment, the applicator 224 may be coupled to the first conveyor 202 and configured to apply the adhesive layer 48 to the first sheet 44 before or after the seedlings 16 are placed thereon and before the second sheet 46 is applied on the first sheet 44. In some embodiments, each of the seedlings 16 are spaced part from one another and the first sheet and the second sheet adhere to one another only between each neighboring seedling 16.

The seedling-package forming process may further include infusing at least one of the first sheet 44 and the second sheet 46 with at least one of an insecticide, a pesticide, a fungicide, a repellant, and a fertilizer. In some embodiments, the seedling-package forming process may further include adding at least one of an insecticide, a pesticide, a fungicide, and a fertilizer to the root structure 32 of each seedling 16 between the first sheet 44 and the second sheet 46. The additive may be added before the seedlings 16 are placed on the first sheet 44 or after the seedling package 18 has been formed. In some embodiments, the seedling-package forming process may further include infusing the adhesive with an additive prior to applying the adhesive on the second sheet 46. In some embodiments, the seedling-package forming process may further include applying an additive to at least one of the first sheet and the second sheet with a separate applicator.

Figure 9:
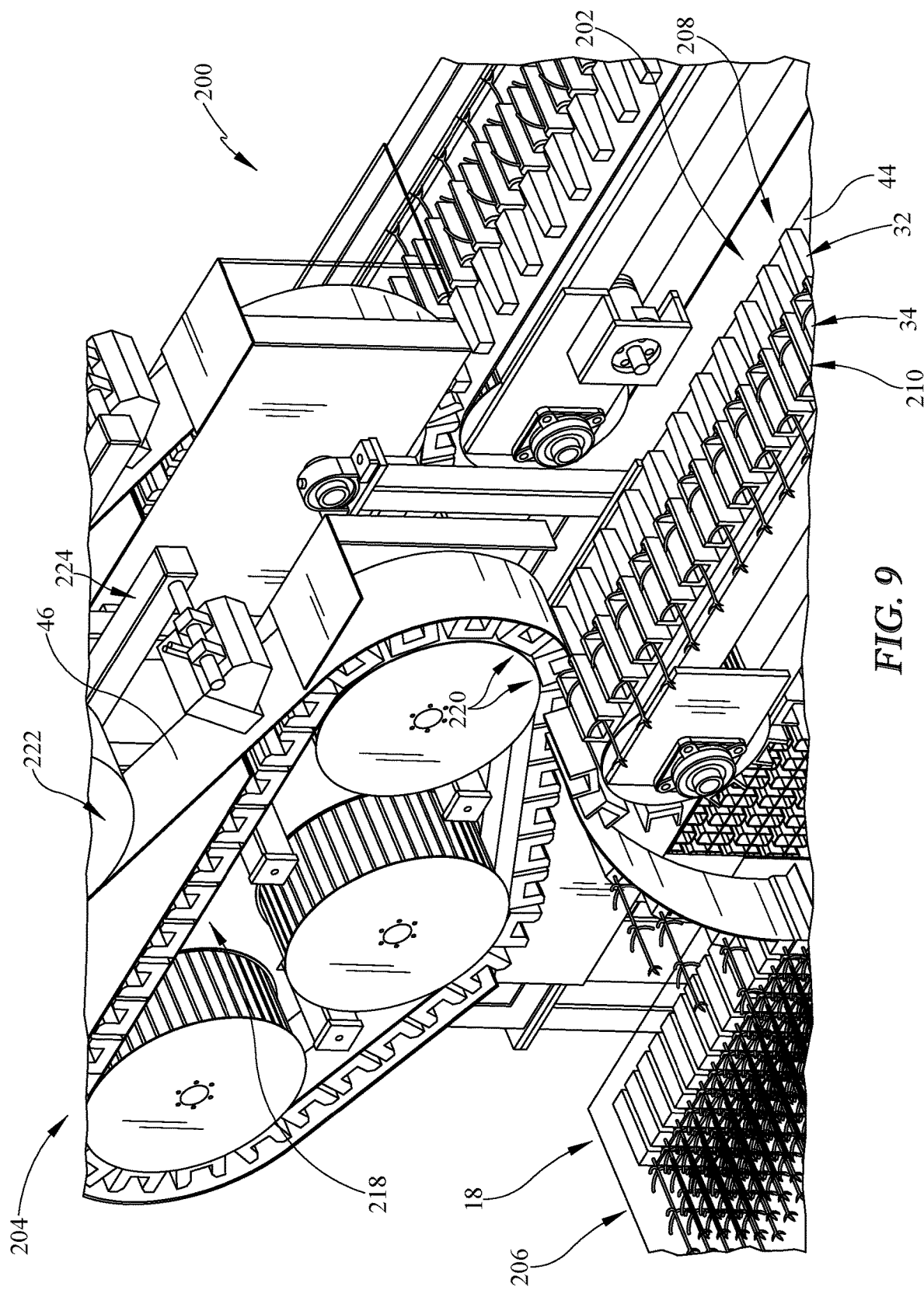
FIG. 9 is a perspective view of a portion of the seedling-package forming system shown in FIG. 4 showing the plurality of seedlings resting on the first sheet and being conveyed toward the second sheet.

The seedling-package forming system 200 may be a stationary system or a mobile system that can be transported to a worksite to form seedling packages 18 for one or more seedling planters 10 that are planting seedlings 16 at the worksite. The seedling-package forming system 200 may include more than one sections each devoted to forming seedling packages 18 as shown in FIG. 9. The seedling-package forming system 200 in the illustrative embodiment includes a first section having a first conveyor 202 and a second conveyor 204 for forming one seedling package 18 and also includes a second section having a separate first conveyor 202 and a separate second conveyor 204 for forming another seedling package 18. Additional sections may be included in the seedling-package forming system 200 to further increase output of seedling packages 18.

Once the seedling package(s) 18 is formed from the seedling-package forming process, the seedling package 18 may be moved to the seedling-storage unit 24 of the seedling planter 10 and then readied for planting. The seedling-storage unit 24 includes a seedling-storage housing 50 defining the interior space 20, a rotation shaft 52 coupled to the seedling-storage housing 50 and located within the interior space 20, and a tabletop 54 coupled to the rotation shaft 52 as shown in FIGS. 4 and 5. The rotation shaft 52 extends vertically through the interior space 20 and is configured to rotate relative to the seedling-storage housing 50 about a shaft-rotation axis 56. The tabletop 54 is coupled to the rotation shaft 52 and is configured to support the seedling package 18 in the interior space 20 for rotation with the rotation shaft 52 about the shaft-rotation axis 56.

The seedling package 18 is wound around the rotation shaft 52 as shown in FIG. 5. The seedling-storage unit 24 may further include a seedling retainer 53 that is configured to receive one of the seedlings 16 to provide an anchor point for the seedling package 18 so that the seedling package can then wind around the rotation shaft 52. The seedling-distribution unit 26 is configured to unwind the seedling package 18 as the seedling planter 10 travels across the ground. The seedling-distribution unit 26 includes a transfer chute 58, a plurality of conveyor rollers 60, and a motion system 62 as shown in FIG. 5. The transfer chute 58 is a tubular member that is configured to carry a single seedling 16 to the ground at a time. The plurality of conveyor rollers 60 are configured to transfer the plurality of seedlings 16 from the seedling-storage unit 24 to the transfer chute 58. The motion system 62 is configured transfer motion of the vehicle body 22 to drive rotation of the conveyor rollers 60 in proportion to a travel speed of the seedling planter 10 across the ground.

The plurality of conveyor rollers 60 includes a first set of conveyor rollers 64 and a second set of conveyor rollers 66 as shown in FIGS. 5 and 6. The first set of conveyor rollers 64 is located between the seedling-storage unit 24 and the second set of conveyor rollers 66. The second set of conveyor rollers 66 is located between the first set of conveyor rollers 64 and the transfer chute 58. Each of the sets of conveyor rollers 64, 66 includes a first roller 68A, 70A and a second roller 68B, 70B. The first rollers 68A, 70A rotate about respective axes 71A, 73A and the second rollers 68B, 70B about respective axes 71B, 73B. The first rollers 68A, 70A are counter-rotating relative to the second rollers 68B, 70B.

The first set of conveyor rollers 64 are configured to pull the seedling package 18 from the seedling-storage unit 24 toward the transfer chute 58 and the second set of conveyor rollers 66 to unwind the seedling package 18 from around the rotation shaft 52 automatically as suggested in FIGS. 5 and 6. The first rollers 68A, 70A of the first and second set of conveyor rollers 64, 66 may be formed to include a plurality of first grooves 72. The second rollers 68B, 70B of the first and second set of conveyor rollers 64, 66 may be formed to include a plurality of second grooves 74. At least one of the plurality of first grooves and the plurality of second grooves may receive an individual seedling of the plurality of seedlings 16.

The first roller 70A of the second set of conveyor rollers 66 includes a plurality of cutting elements 76 that are configured to separate each seedling of the plurality of seedlings 16 from the seedling package 18 prior to the seedling 16 reaching the transfer chute 58. Once separated from the rest of the seedling package 18, the seedling 16 drops to the ground 14 through the transfer chute 58 and is planted. The plurality of cutting elements 76 is angled relative to axis 73A and may be arranged in a helical pattern. Each cutting element 76 is arranged to lie between two or more grooves 72 to separate each seedling 16 from the seedling package 18 in the space between each seedling 16. The plurality of second grooves 74 formed on the second roller 70B are each aligned angularly with a corresponding cutting element 76 of the plurality of cutting elements 76 such that each cutting element 76 extends into a corresponding groove 74 through the seedling-retainer band 17 as the rollers 70A, 70B counter-rotate relative to one another. Rollers 68A and 70A rotate in a first direction while rollers 68B and 70B rotate in an opposite, second direction.

In some embodiments, one or more of the rollers 60 may include a plurality of perforators 60P formed on an outer surface thereof. The plurality of perforators are raised nubs that puncture the seedling-retainer band 17 before the seedlings 16 are released from the planter 10. The seedling-retainer band 17 may be punctured by the perforators 60P to form openings through one or both of the sheets 44, 46 to the seedling root structure to allow water and/or nutrients to enter therethrough and/or to allow soil and roots to exit therethrough once the seedlings 16 are planted.

The motion system 62 is configured to synchronize movement of the plurality of rollers 60 with movement of the vehicle body 22 so that the seedling planter 10 automatically and periodically drops a seedling 16 into the opening 12 in the ground 14 as the seedling planter 10 travels over the ground 14. In the illustrative embodiment, the motion system 62 derives motion from the soil-opening system 31 to drive rotation of the plurality of conveyor rollers 60 so that seedlings 16 are planted only when the soil-opening system 31 is forming the opening 12 in the ground 14. The soil-opening system 31 includes a coulter 78, a plow share 80, and a pair of soil closers 82, which can each be lowered into contact with the ground 14 to form the opening 12 and plant the seedlings 16. The coulter 78 is driven in rotation about horizontal axis 79 when the coulter 78 is lowered and the seedling planter 10 is moving across the ground 14. The motion system 62 is coupled to the coulter 78 and transfers rotation of the coulter 78 about axis 79 into rotation of the plurality of conveyor rollers 60. In some embodiments, motion system 62 may be coupled to another part of the seedling planter 10 to transfer motion to the plurality of conveyor rollers 60 such as the wheels 30. In some embodiments, the seedling planter 10 includes a motor, engine, or hydraulic system or is coupled to a separate vehicle with an engine, motor, or hydraulic system to move the plurality of conveyor rollers 60.

Figure 10:
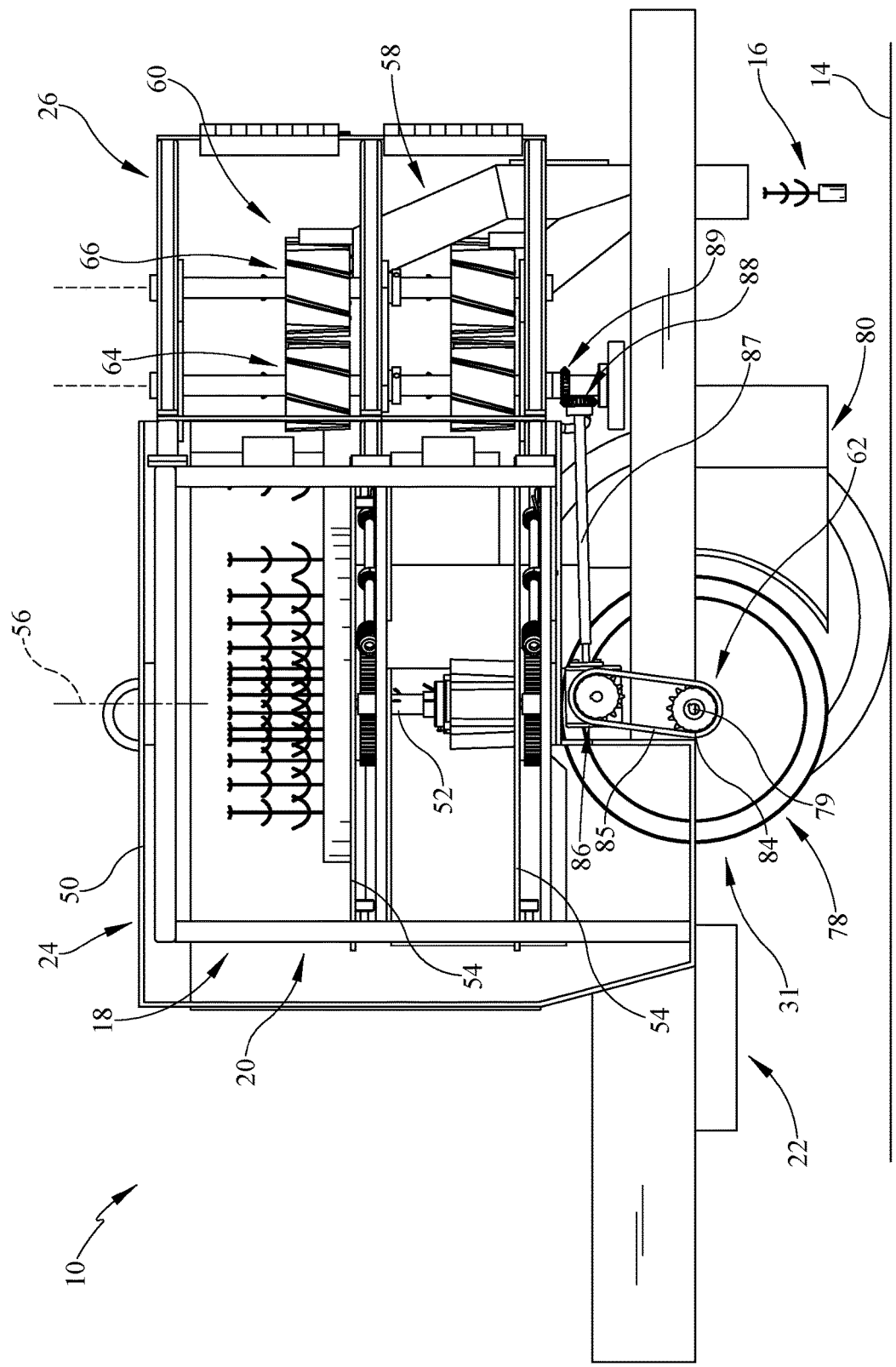
FIG. 10 is a side elevation view of the seedling planter shown in FIG. 1 with portions removed to show the seedling package stored within an interior space of the seedling planter.
Figure 11:
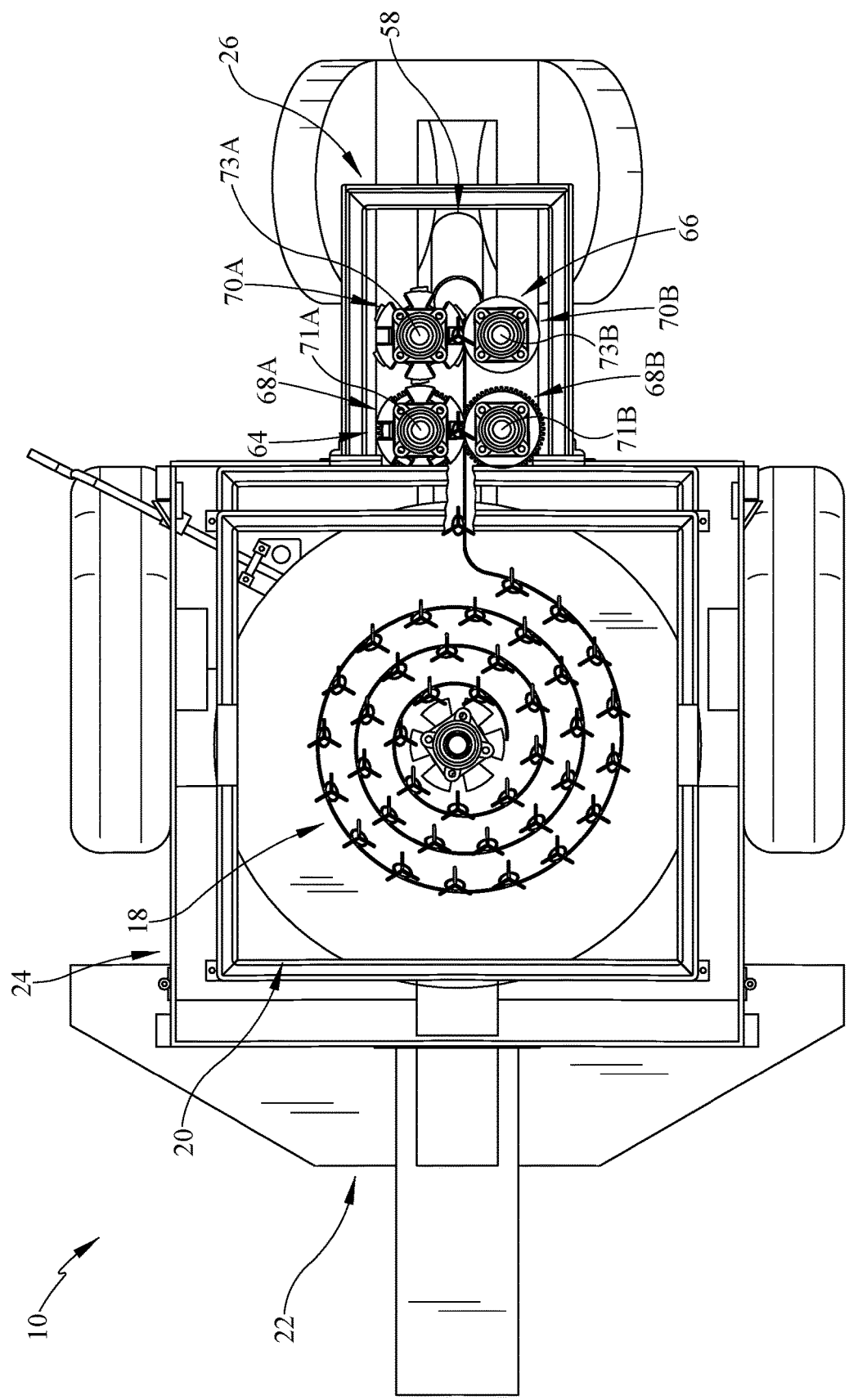
FIG. 11 is a top plan view of the seedling planter with portions removed to show that the seedling package is wound around a central seedling retainer and directed aft toward a seedling distribution unit.

The motion system 62 includes a plurality of gears and linkages that transfer rotation of the coulter 78 to the plurality of conveyor rollers 60 to cause rotation thereof as shown in FIGS. 10-12. A first gear 84 is coupled to the coulter 78 for rotation therewith about the axis 79. A belt or chain 85 loops around the first gear 84 and a second gear 86 that is coupled to a drive shaft 87. The drive shaft 87 has a first bevel gear 88 coupled to a distal end thereof. The first bevel gear 88 is coupled to a second bevel gear 89 that is coupled to one of the conveyor rollers 60 to drive rotation thereof. Conveyor rollers 68A, 68B are coupled to one another by a pair of spur gears 91, 93 so that motion provided by the drive shaft 87 and bevel gears 88, 89 is transferred to both conveyor rollers 68A, 68B and to cause counter rotation thereof. Conveyor rollers 68B and 70B are coupled to one another by respective gears 95, 97 and a belt 99 looped around gears 95, 97 to synchronize rotation of conveyor rollers 68B and 70B. Conveyor rollers 68A, 70A are also coupled together by a similar arrangement of gears and a belt to synchronize rotation of conveyor rollers 68A, 70A. Although various gears are described herein as having a specific form and arrangement, it should be appreciated that other types of gears may also be used in place of those gears already described. Some other types of gears that may be used to transfer motion of the coulter 78 to the conveyor rollers 60 include spur gears, helical gears, miter gears, worms/worm gears, screw gears, internal gears, or any other suitable type of gear.

Rotation of the coulter 78 is reduced by the motion system 62 such that conveyor rollers 60 rotate at a slower rate compared to the coulter 78. In the illustrative embodiment, the conveyor rollers 60 rotate at a rate that causes a single seedling 16 to drop through the transfer chute 58 to the ground 14 when the seedling planter 10 travels a distance across the ground 14 within a range of about 4 feet to about 10 feet. In some embodiments, a single seedling 16 is dropped to the ground when the seedling planter 10 travels a distance across the ground 14 within a range of about 5 feet to about 8 feet. In some embodiments, a single seedling 16 is dropped to the ground when the seedling planter 10 travels a distance across the ground 14 of about 5 feet. In some embodiments, a single seedling 16 is dropped to the ground when the seedling planter 10 travels a distance across the ground 14 of about 8 feet. The seedling planter 10 may drop a single seedling 16 at any interval in other embodiments.

The illustrative embodiment shown in FIGS. 10-12 includes upper and lower portions of identical parts from the seedling-storage unit 24 and the seedling-distribution unit 26 to increase the amount of seedlings that are stored and planted using the seedling planter 10. For example, the seedling-storage unit 24 includes a plurality of tabletops 54 each of which is coupled to the rotation shaft 52 and stacked vertically relative to one another. Each tabletop 54 is configured to support a separate seedling package 18 which is also conveyed from the interior space 20 to the ground by the seedling-distribution unit 26. Additionally, the seedling-distribution unit 26 includes a separate set of rollers 60 (i.e. an upper set and a lower set) for each tabletop 54 that is included in the seedling-storage unit 24 and a respective branch 59, 61 of the transfer chute 58 that corresponds with each set of rollers 60.

The seedling-storage unit 24 may further include a loading system that is configured to facilitate transfer of the seedling package 18 from the storage bin 206 to the interior space 20 of the seedling-storage unit 24 as shown in FIG. 13. The loading system includes a gear wheel 94 coupled to the rotation shaft 52 for rotation about the shaft-rotation axis 56 with the rotation shaft 52, a worm 92 interlocked with teeth of the gear wheel 94, and a winding handle 90 coupled to the worm 92. Rotation of the handle 90 about an axis 90A drives rotation of the worm 92, thereby driving rotation of the rotation shaft 52 about the rotation axis 56 to wind the seedling package 18 around the rotation shaft 52. One seedling 16 of the seedling package 28 may be coupled to the seedling retainer 53 prior to winding to provide an anchor point for the seedling package 18. The seedling-storage unit 24 includes a corresponding loading system for each tabletop 54 included in the seedling storage unit 24, however, in other embodiments, a single loading system may be used to rotate the two or more tabletops 54 and simultaneously load each section of the seedling-storage unit 24 with a seedling package 18.

In some embodiments, the tabletop(s) 54 may be stationary and the shaft 52 may be omitted. In this instance, the seedling package 18 may be placed into the seedling-storage unit 24 in the arrangement shown in FIG. 5. The seedling package 18 may be placed in the seedling-storage unit 24 with or without the bin 206.

What is claimed is:

1. A seedling planter comprising
a vehicle body including a frame, a plurality of wheels supporting the frame above ground, and a soil-opening system configured to form an opening in the ground as the vehicle body travels across the ground,
a seedling-storage unit coupled to the vehicle body and defining an interior space that is configured to store a plurality of seedlings, wherein the seedling-storage unit includes a seedling retainer configured to engage at least one of the seedlings, a rotation shaft configured to rotate relative to the vehicle body about a shaft-rotation axis, and a tabletop coupled to the rotation shaft and configured to support the plurality of seedlings in the interior space for rotation with the rotation shaft about the shaft-rotation axis, wherein the seedling storage unit further includes a loading system including a gear wheel coupled to the rotation shaft for rotation about the shaft-rotation axis with the rotation shaft, a worm gear interlocked with teeth of the gear wheel, and a winding handle coupled to the worm gear, wherein rotation of the worm gear by the handle drives rotation of the tabletop about the rotation axis to wind the plurality of seedlings around the rotation shaft, and a seedling-distribution unit configured to automatically convey the plurality of seedlings from the interior space to the opening in the ground, wherein the plurality of seedlings are wound around the rotation shaft and the seedling-distribution unit is configured to unwind the plurality of seedlings as the seedling planter travels across the ground.

2. The seedling planter of claim 1, wherein the seedling-storage unit includes a plurality of tabletops, each tabletop coupled to the rotation shaft and configured to support a separate package of the seedlings.

3. The seedling planter of claim 1, wherein the seedling-distribution unit includes a transfer chute configured to carry a single seedling to the ground at a time, a plurality of conveyor rollers configured to transfer the plurality of seedlings from the seedling-storage unit to the transfer chute, and a motion system configured to drive rotation of the conveyor rollers in proportion to a travel speed of the seedling planter across the ground.

4. The seedling planter of claim 3, wherein the plurality of conveyor rollers includes a first roller and a second roller, and wherein the first roller and the second roller are counter-rotating.

5. The seedling planter of claim 4, wherein the first roller is formed to include a first plurality of grooves and the second roller is formed to include a second plurality of grooves, and at least one of the first plurality of grooves and the second plurality of grooves is configured to receive a seedling of the plurality of seedlings.

6. The seedling planter of claim 4, wherein at least one of the first roller and the second roller includes a plurality of cutting elements that are configured to separate each seedling of the plurality of seedlings into the single seedling upstream of the transfer chute.

7. The seedling planter of claim 6, wherein the plurality of cutting elements are arranged at an angle relative to a rotation axis of each of the plurality of conveyor rollers.

8. The seedling planter of claim 4, wherein the first roller includes a plurality of cutting elements that are configured to separate each seedling of the plurality of seedlings into the single seedling upstream of the transfer chute and the plurality of grooves formed on the second roller are each aligned angularly with a corresponding cutting element of the plurality of cutting elements such that each cutting element extends into the corresponding groove per revolution of the first roller and the second roller.

9. The seedling planter of claim 3, wherein the plurality of conveyor rollers are configured to unwind the plurality of seedlings as the seedling planter travels across the ground.

10. A seedling planter comprising
a vehicle body including a frame, a plurality of wheels supporting the frame above ground, and a soil-opening system configured to form an opening in the ground as the vehicle body travels across the ground,
a seedling-storage unit coupled to the vehicle body and defining an interior space that is configured to store a plurality of seedlings, wherein the seedling-storage unit includes a seedling retainer configured to engage at least one of the seedlings, a rotation shaft configured to rotate relative to the vehicle body about a shaft-rotation axis, and a plurality of tabletops, each tabletop coupled to the rotation shaft and configured to support a separate package of the seedlings in the interior space for rotation with the rotation shaft about the shaft-rotation axis, and a seedling-distribution unit configured to automatically convey the plurality of seedlings from the interior space to the opening in the ground.

11. The seedling planter of claim 10, wherein the plurality of seedlings are wound around the rotation shaft and the seedling-distribution unit is configured to unwind the plurality of seedlings as the seedling planter travels across the ground.

12. The seedling planter of claim 11, wherein the seedling storage unit further includes a loading system including a gear wheel coupled to the rotation shaft for rotation about the shaft-rotation axis with the rotation shaft, a worm gear interlocked with teeth of the gear wheel, and a winding handle coupled to the worm gear, wherein rotation of the worm gear by the handle drives rotation of at least one of the plurality of tabletops about the rotation axis to wind the plurality of seedlings around the rotation shaft.

13. The seedling planter of claim 10, wherein the seedling-distribution unit includes a transfer chute configured to carry a single seedling to the ground at a time, a plurality of conveyor rollers configured to transfer the plurality of seedlings from the seedling-storage unit to the transfer chute, and a motion system configured to drive rotation of the conveyor rollers in proportion to a travel speed of the seedling planter across the ground.

14. The seedling planter of claim 13, wherein the plurality of conveyor rollers includes a first roller and a second roller, and wherein the first roller and the second roller are counter-rotating.

15. The seedling planter of claim 14, wherein the first roller is formed to include a first plurality of grooves and the second roller is formed to include a second plurality of grooves, and at least one of the first plurality of grooves and the second plurality of grooves is configured to receive a seedling of the plurality of seedlings.

16. The seedling planter of claim 14, wherein at least one of the first roller and the second roller includes a plurality of cutting elements that are configured to separate each seedling of the plurality of seedlings into the single seedling upstream of the transfer chute.

17. The seedling planter of claim 16, wherein the plurality of cutting elements are arranged at an angle relative to a rotation axis of each of the plurality of conveyor rollers.

18. The seedling planter of claim 14, wherein the first roller includes a plurality of cutting elements that are configured to separate each seedling of the plurality of seedlings into the single seedling upstream of the transfer chute and the plurality of grooves formed on the second roller are each aligned angularly with a corresponding cutting element of the plurality of cutting elements such that each cutting element extends into the corresponding groove per revolution of the first roller and the second roller.

19. The seedling planter of claim 13, wherein the plurality of seedlings are wound around the rotation shaft and the plurality of conveyor rollers are configured to unwind the plurality of seedlings as the seedling planter travels across the ground.

* * * * *